United States Patent [19]

Pascault et al.

[11] Patent Number: 5,057,573
[45] Date of Patent: Oct. 15, 1991

[54] URETHANE POLYMER COMPOSITION AND PREPARATION OF ARTICLES FROM THESE POLYMERS

[75] Inventors: Jean Pierre Pascault, Villeurbanne; Lëon Cuve, Lyon, both of France

[73] Assignee: Societe Industrielle D'Applications Nouvelles De Procedes De Moulages Industriels (SAMI), Malesherbes, France

[21] Appl. No.: 466,214

[22] Filed: Jan. 17, 1990

[30] Foreign Application Priority Data

Jan. 19, 1989 [FR] France .................. 89 00600

[51] Int. Cl.$^5$ .............................. C08K 3/22
[52] U.S. Cl. .......................... 524/871; 524/589; 524/728; 521/159; 521/160; 521/173; 521/176
[58] Field of Search .............. 524/762, 589, 871, 728; 521/159, 160, 173, 176

[56] References Cited

U.S. PATENT DOCUMENTS

| | | | |
|---|---|---|---|
| 4,335,029 | 6/1982 | Dabi et al. | 524/589 |
| 4,376,834 | 3/1983 | Goldwasser et al. | 521/159 |
| 4,950,709 | 8/1980 | Schleuter et al. | 524/728 |
| 4,985,490 | 1/1991 | Rosthauser et al. | 524/871 |

Primary Examiner—John Kight, III
Assistant Examiner—Duc Truong
Attorney, Agent, or Firm—Ladas & Parry

[57] ABSTRACT

The present invention relates to a urethane polymer composition which contains:
an $\alpha, \omega$-diol oligomer
an isocyanate,
a chain extender diol, and
an emulsifying agent which is the product of reaction between:
(a) an $\alpha, \omega$-diol oligomer whose structure is identical or close in polarity to that of the above $\alpha, \omega$-diol oligomer,
(b) a diisocyanate, and optionally
(c) a chain extender of the diol or monoalcohol type, such as a monofunctional polyethylene oxide.

It also relates to a process for the preparation of articles from this composition and to the molded articles thus obtained.

21 Claims, 2 Drawing Sheets

— RESPONSE OF THE POLYMER PREPARED IN BULK ACCORDING TO EXAMPLE 2
▲ ▲ RESPONSE OF THE POLYMER PREPARED IN BULK WITH 2% OF EO 350
• • • RESPONSE OF THE POLYMER PREPARED IN BULK WITH 5% OF EO 350
• • • • RESPONSE OF THE POLYMER PREPARED IN BULK WITH 10% OF EO 350

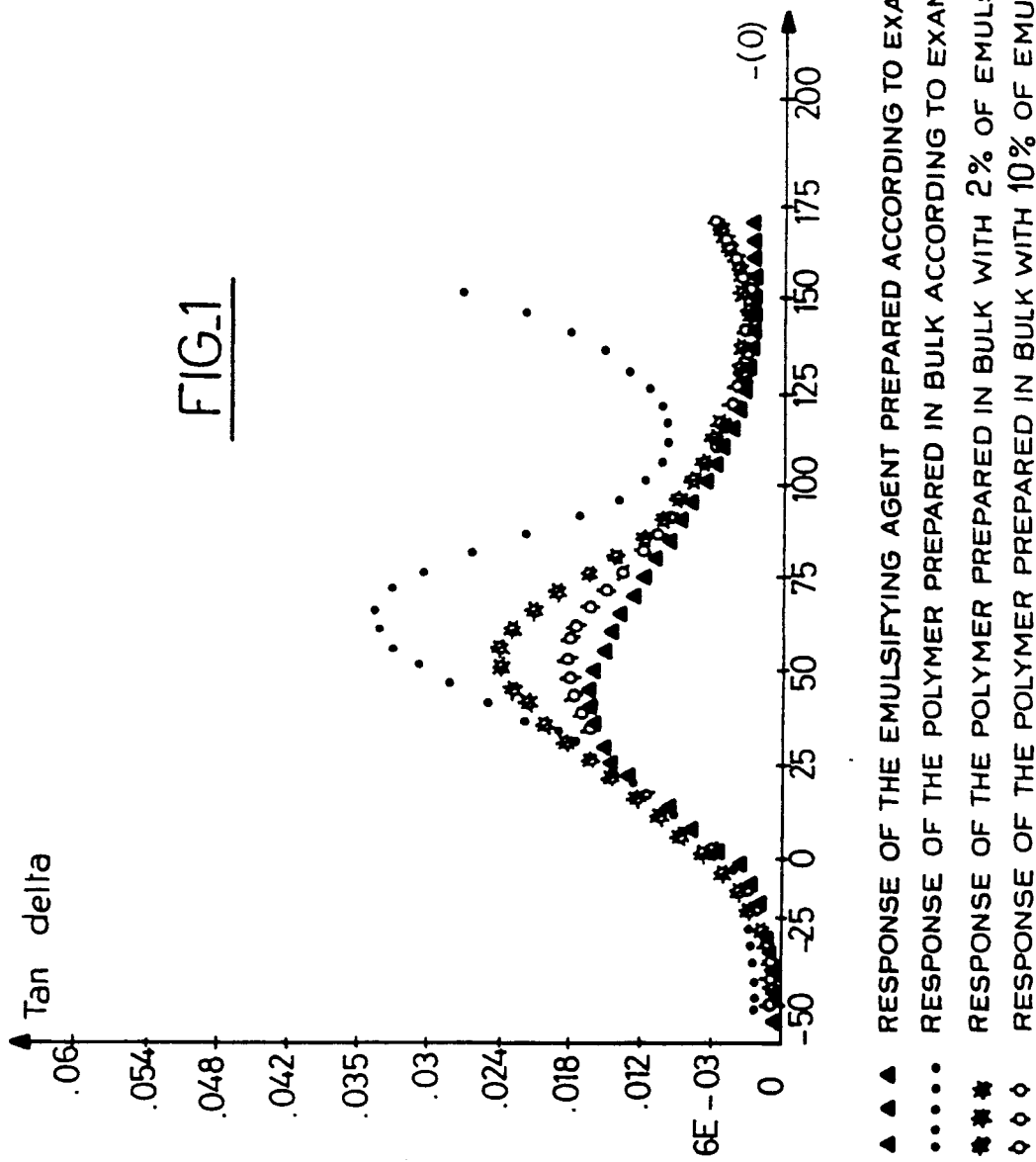

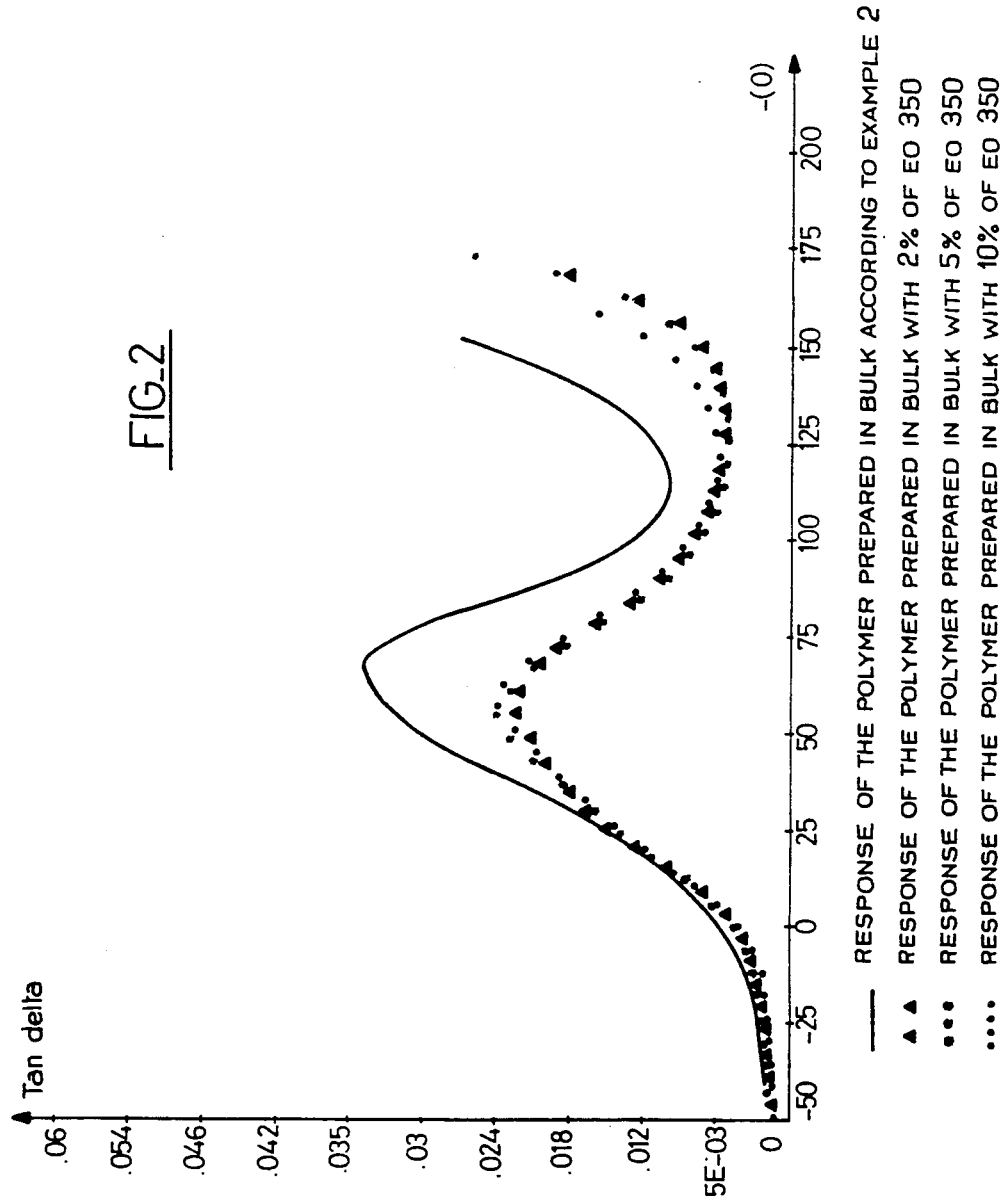

URETHANE POLYMER COMPOSITION AND PREPARATION OF ARTICLES FROM THESE POLYMERS

The present invention relates to a urethane polymer composition.

The term polyurethane is commonly employed to denote a wide variety of polymeric materials including both crosslinked elastomers and thermoplastic elastomers and paints, adhesives and molded articles It is a conventional term which applies to macromolecules containing the urethane functional group

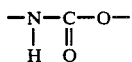

in the repeat unit.

Urethane polymers consist, therefore, of flexible sequences, each of these consisting of an $\alpha,\omega$-hydroxylated oligomeric macrodiol and of rigid sequences resulting from the reaction between a diisocyanate and a chain extender.

The properties of urethane polymers result, in fact, from their microheterophase character (size of the order of a hundred angströms), due to the thermodynamic incompatibility between these flexible sequences and these rigid sequences.

Consequently, the polycondensation method employed affects the final properties of the urethane polymer compositions thus obtained by affecting the morphology.

Thus, when the polycondensation is performed not in solution but in bulk, depending on the industrial objective, a phenomenon of phase macroseparation (phase size of the order of a micron) is superimposed on the phase microseparation phenomenon inherent in the structure of the urethane polymer. The materials obtained then exhibit a high polydispersity with the presence of isolated rigid segments.

The bulk polycondensation of urethane polymer based on nonpolar $\alpha,\omega$-diol oligomer gives the most pronounced case of immiscibility. In this case, the addition of a diol as a chain extender during the second stage of the polycondensation induces an immediate phase macroseparation owing to the thermodynamical incompatibility of the reactants. For example, the bulk synthesis of urethane polymers containing a polybutadiene sequence, compounds which exhibit interesting properties due to their hydrophobic hydrocarbon chains, that is to say excellent electrical properties, low water absorption and low rate of water vapor transmission, takes place in a two-phase medium. This then results in a heterogeneity of the products, which is detrimental to their properties.

Nevertheless, since the industrial objective is to perform such polycondensations in bulk, the present invention now proposes a solution to this phenomenon of phase macroseparation by introducing an emulsifying agent in the course of these said polycondensations.

This emulsifying agent is a urethane polymer obtained beforehand, for example, in homogeneous solution, which, dispersed in the $\alpha,\omega$-diol oligomer, makes it possible to reduce this phenomenon to a minimum or even to eliminate it and, consequently, to improve the mechanical or electrical properties of the urethane polymer compositions obtained according to the invention.

The urethane polymer compositions obtained according to the invention contain:
an $\alpha,\omega$-diol oligomer
an isocyanate,
a chain extender diol, and
an emulsifying agent which is the product of reaction between:
(a) an $\alpha,\omega$-diol oligomer whose chain structure is identical or close in polarity to that of the above $\alpha,\omega$-diol oligomer,
(b) a diisocyanate, and optionally
(c) a chain extender of the diol or monoalcohol type, such as a monofunctional polyethylene oxide.

An $\alpha,\omega$-diol oligomer is understood to mean oligomers of the type of polyester, polyether, polyolefin of natural or synthetic origin and polysiloxane. Among these oligomers there may be mentioned more particularly polyoxyethylene, polyoxypropylene, polyoxytetramethylene, polybutanediol adipate, polycaprolactone, polybutadiene, polyisoprene and hydrogenated polybutadiene. These oligomers have a number-average molecular mass of between 600 and 10,000, preferably between 2,000 and 4,000 and a number-average functionality Fn (OH) of between 1.4 and 4 and preferably close to 2.

This number-average functionality Fn (OH), or average hydroxyl number per oligomer chain, is related to the value of the number-average mass Mn by:

Fn (OH)=OH eq$\times$Mn, where OH eq:OH equivalents/kg.

The isocyanates are chosen from the usual diisocyanates and preferably 2,4- or 2,6-toluene diisocyanate, diphenylmethane diisocyanate, isophorone diisocyanate and the derivatives of these products with a functionality higher than 2.

The chain extender diols themselves are chosen from the usual diols with a molecular mass lower than 500 and are preferably 1,4-butanediol or hydroquinone di-$\beta$-hydroxyethyl ether.

In the case of the composition of the emulsifying agent, the chosen $\alpha,\omega$-diol oligomer is close or identical in polarity with that of the oligomer employed for the preparation of the urethane polymer composition. A close or identical polarity means solubility parameters which are sufficiently close, that is to say a difference between the solubility parameters not exceeding 1 to 2 cal$^{\frac{1}{2}}$ cm$^{-3/2}$ mole$^{-1}$.

The monofunctional polyethylene oxide optionally employed for the preparation of the emulsifying agent has, in its case, a molecular mass of between 46 and 5,000 and preferably between 250 and 500.

Depending on the nature of these various constituents, namely the $\alpha,\omega$-diol oligomer, the diisocyanate, the chain extender and the emulsifier and the ratio of these various constituents in the final composition, it is possible according to the invention to produce rigid or flexible urethane polymer compositions exhibiting advantageous mechanical or electrical properties.

The $\alpha,\omega$-diol oligomer, the isocyanate and the chain extender diol can react in the presence of the emulsifying agent with a respective stoichiometry included between the 1/2/1 and 1/7/6 formulations, and preferably 1/3/2. In the case of a 1/2/1 stoichiometry, which corresponds substantially to 80% of flexible sequences, when the molecular mass of the $\alpha,\omega$-diol oligomer is of the order of 2,000, a flexible urethane polymer composition will be preferably obtained, whereas in the case of a 1/7/6 stoichiometry, namely 40% of flexible sequences, a rigid urethane polymer composition will be obtained. The 1/3/2 stoichiometry itself corresponds to 30% of rigid sequences.

The said emulsifying agent itself is present in these compositions in a concentration of 1 to 10% by weight and preferably of 2 to 5% by weight.

This emulsifying agent can, in fact, be prepared according to two methods. In the case where it is optionally composed of a chain extender diol, the α,ω-diol oligomer, the diisocyanate and therefore optionally the said chain extender diol react with a respective stoichiometry included between the limiting formulations 1/1/0 and 1/3/2 and preferably with formulations close to 1/1/0 or 1/2/1. In this case, the emulsifying agent will be called the multiblock emulsifying agent.

In a second case, it may be prepared in the same way from an α,ω-diol oligomer and from a diisocyanate but, this time, in the presence of an alcohol such as monofunctional polyethylene oxide, which then react with a respective stoichiometry included between 1/2/2 and 1/4/6, and preferably equal to 1/2/2. In this second case the emulsifying agent will be called a triblock emulsifying agent.

The presence of a multiblock emulsifying agent in a urethane polymer composition according to the invention improves more particularly its dielectric properties, while the presence of a triblock emulsifying agent preferably strengthens the resistance of this composition to mechanical stresses.

The dielectric properties of these urethane polymer compositions according to the invention are, in fact, improved according to two criteria:
the dielectric losses are reduced, and
the dielectric characteristics are maintained up to 140° C.

The urethane polymer compositions based on a nonpolar α,ω-diol oligomer also exhibit improved hydrophobic properties. Thus, the urethane polymer compositions containing hydrogenated polybutadiene sequences, which have interesting properties due to their hydrophobic hydrocarbon chain, exhibit a low water absorption and low rates of transmission of water vapor.

The invention also relates to a process for the preparation of articles made of urethane polymer, wherein:
the said emulsifying agent is mixed with the α,ω-diol oligomer so as to obtain a dispersion of the emulsifying agent in the α,ω-diol oligomer, this dispersion being preferably of the order of 5%,
the said dispersion thus obtained is heated with the isocyanate and then, optionally,
the chain extender diol is added to this mixture so as to obtain a urethane polymer composition according to the invention, and
the shaping of the article is produced by hot molding of this composition.

The emulsifying agent present in the urethane polymer composition is itself prepared beforehand, either in solution when it is a multiblock emulsifying agent, or in bulk if it is a triblock emulsifying agent.

In the case of a multiblock emulsifying agent,
the said α,ω-diol oligomer and the said diisocyanate are heated,
the mixture thus obtained is dissolved in an appropriate polar solvent,
the chain extender diol is optionally added to this solution, and
this solution is heated.

In this case, the appropriate solvent must, in fact, be a solvent for the three compounds—the α,ω-diol oligomer, the diisocyanate and the chain extender diol. Thus, the polar solvent will be preferably chosen from THF, DMF, dioxane and mixtures of these.

The preparation of the emulsifying agent may be optionally carried out in the presence of an organometallic catalyst. This catalyst is then introduced into the mixture in a quantity of 0.01% of the total mass of the reactants of the said emulsifying agent, for example dibutyltin dilaurate can act as this catalyst.

The triblock emulsifying agent itself is prepared in bulk, that is to say by heating the α,ω-diol oligomer with the diisocyanate and then by adding the monofunctional polyethylene oxide to this mixture and, finally, by heating this last mixture.

More precisely, the heating stages involved in the processes of preparation of urethane polymer compositions according to the invention and of the emulsifying agents are carried out under primary vacuum at a temperature close to 80° C. for 2 to 4 hours.

The shaping of the article by hot molding is itself commonly performed at 110° C. for 6 hours.

The invention also relates to the molded articles which are obtained from a polyurethane composition according to the invention. These articles, which are of interest because of their electrical, hydrophobic and mechanical properties, are more particularly useful as dielectric components.

Other advantages and characteristics of the invention will appear on reading the following examples, given merely by way of illustration.

In a first step, we propose a general operating method relating successively to the respective preparations of the multiblock or triblock emulsifying agents, to their dispersions in an α,ω-diol oligomer and, lastly, to the preparation of a urethane polymer composition.

1) Preparation of a multiblock emulsifying agent

The α,ω-diol oligomer and the diisocyanate are mixed at 80° C. under primary vacuum for 4 hours. The mixture is dissolved in a polar solvent at ambient temperature (T=25° C.). An organometallic catalyst is then optionally added, followed by the chain extender diol. The solution thus obtained is heated to 60° C. for 3 hours. The emulsifying agent is then obtained in solution.

Dispersion of a multiblock emulsifying agent

This is obtained by adding the chosen α,ω-diol oligomer again, in the desired proportion, to the solution containing the emulsifying agent. The solvent is then removed by evaporation.

2) Preparation of the triblock emulsifying agent

The α,ω-diol oligomer and the diisocyanate are mixed at 80° C. under primary vacuum for 4 hours. Monofunctional polyethylene oxide with a mass of between 46 and 5,000 is added. The mixture is stirred at 80° C. for 2 hours. The emulsifying agent is obtained directly.

Dispersion of the triblock emulsifying agent

The dispersion of this emulsifying agent in the α,ω-diol oligomer is carried out with mechanical stirring at 80° C.

3) Preparation of a urethane polymer composition

In a first stage, the isocyanate is added in the desired molar proportions to the mixture of α,ω-diol oligomer and of the emulsifying agent at 80° C. under primary vacuum for 4 hours. The chain extender diol is then added in a second stage. The article made of urethane polymer is then obtained after filling a mold and curing at 110° C. for 6 hours.

4) Dielectric measurements of the urethane polymer compositions

Measurements of the dielectric parameters of the samples are carried out with the aid of two Hewlett-Packard 4274.A and 4275.A bridges covering a frequency range of $10^2$ to $10^5$ Hz (low frequencies) and of $10^2$ to $10^7$ Hz (high frequencies) respectively. The measurement cell (Polymer Laboratories) is of the "plane capacitor" type. It is thermostated and controlled by a temperature regulator driven by an Apple IIe microcomputer which enables data to be stored. The samples are films obtained in a press. Two aluminum sheets permit the contact between the sample and the electrodes. The impedance of the sample is considered to be equivalent to that of a circuit consisting of a resistance R and a capacity C which are mounted in parallel.

The values of capacities C and of dielectric losses tan $\delta$ are determined at equilibrium.

The values $\rho$, $\epsilon_r'$, $\epsilon_r''$ and tan $\delta$ are given by the relationships:

$$\rho = \frac{S}{Ge} = \frac{RS}{e}$$

$$\tan \delta = \frac{G}{C\omega} = \frac{1}{RC\omega}$$

$$\epsilon_r' = \frac{Ce}{\epsilon_o S} \text{ (relative dielectric constant)}$$

$$\epsilon_r'' = \epsilon_r' \tan \delta$$

where
G: conductance
$\omega$: frequency pulsation $\omega = 2\pi\epsilon$
S: sample area (9.08 cm$^2$ here)
e: sample thickness (from 250 to 700 μm here)

The examples below refer to urethane polymer compositions obtained according to the general operating method described above. In the case of some examples, the properties of the compositions thus obtained have been determined by analysis. The results are then presented in the form of figures or tables.

EXAMPLE 1

Introduction of a Multiblock Emulsifying Agent into a Urethane Polymer Composition Based on Hydrogenated Polybutadiene Preparation of an emulsifying agent of 1/1 formulation 44.88 g (1 mole) of hydrogenated polybutadiene of mass 2,000 and of functionality $\overline{F}n = 1.8$ and 5 g (1 mole) of diphenylmethane diisocyanate in solution in 500 ml of THF are heated to 60° C. for 3 hours in the presence of 0.005 g of dibutyltin dilaurate.

Preparation of an emulsifying agent of 1/3/2 formulation 44.88 g (1 mole) of hydrogenated polybutadiene of mass 2,000 and 15 g (3 moles) of diphenylmethane diisocyanate are mixed at 80° C. under primary vacuum for 4 hours. The mixture is then dissolved in 750 ml of THF at ambient temperature. 3.6 g (2 moles) of 1,4-butanediol and 0.006 g of dibutyltin dilaurate are then added. The reaction is continued at 60° C. for 4 hours.

Dispersion of the emulsifying agents

Hydrogenated polybutadiene is added again to the solutions obtained above so as to obtain a mixture containing 5% of the weight of emulsifying agent, which corresponds, in the case of the emulsifying agent of 1/1 formulation to 940 g of hydrogenated polybutadiene, and in that of the emulsifying agent of 1/3/2 formulation to 1206 g of hydrogenated polybutadiene. The solvent is then removed by evaporation at 70° C. under a vacuum of 15 mm Hg.

Preparation of the urethane polymer composition

The preparative method employed will be the same with or without emulsifying agent and whatever the type of emulsifying agent chosen.

334 g (3 moles) of diphenylmethane diisocyanate are added at 80° C. for 4 hours to 1,050 g or 1,000 g of hydrogenated polybutadiene, that is to say containing or not containing an emulsifying agent. 1,4-Butanediol is then added again in a molar proportion of 2/1 relative to the hydrogenated polybutadiene, that is 80.2 g. The mixing takes place in a reactor for 30 seconds. The urethane polymer composition obtained is then cast in a mold, where it is cured for 6 hours at 110° C.

The materials thus obtained are homogeneous and transparent. An analysis of molecular mass distributions shows the absence of isolated rigid segments.

Dielectric measurements were carried out on some materials containing such multiblock emulsifying agents. The results obtained for each of these are illustrated by a curve in FIG. 1. The improvement contributed at high temperature by the emulsifying agent in a bulk synthesis is clearly seen.

EXAMPLE 2

Introduction of a Triblock Emulsifying Agent into a Urethane Polymer Composition Based on Hydrogenated Polybutadiene Preparation of the triblock emulsifying agent 44.88 g (1 mole) of hydrogenated polybutadiene are reacted with 10 g (2 moles) of diphenylmethane diisocyanate at 80° C. for 4 hours under primary vacuum. 14 g (2 moles) of monofunctional polyethylene oxide of mass 350 are then added. The reaction is continued at 120° C. for 2 hours.

Dispersion of the emulsifying agent

Hydrogenated polybutadiene is again added to the mixture obtained above so as to obtain the desired percentage of triblock emulsifying agent. For example, to obtain a dispersion of the order of 5% of the said emulsifying agent, 1,309 g of hydrogenated polybutadiene are added. The dispersion is obtained merely by mechanical stirring of this last mixture.

Preparation of the urethane polymer composition

This is carried out in the same way as in Example 1.

Dielectric measurements were performed on some materials thus obtained. The results are shown graphically in FIG. 2. The improvement contributed at high temperature by the emulsifying agent in a mass synthesis is clearly seen.

EXAMPLE 3

Introduction of a Multiblock Emulsifying Agent at a Concentration of 2% into a Urethane Polymer Composition Based on Polycaprolactone.

Preparation of the emulsifying agent 40 g (1 mole) of polycaprolactone of mass 2,000 and of functionality Fn=2 are mixed with 15 g (3 moles) of diphenylmethane diisocyanate and are heated to 80° C. for 4 hours.

3.6 g (2 moles) of 1,4-butanediol, 0.005 g of dibutyltin dilaurate catalyst and 1 liter of THF at 25° C. are then added. The mixture is heated to 60° C. for 3 hours.

Dispersion of the emulsifying agent

The dispersion of the emulsifying agent is produced by adding 5 liters of solvent and 2,871 g of polycaprolactone to the mixture. The solvent is then removed by evaporation at 70° C. under a pressure of 15 mmHg.

Preparation of the urethane polymer composition 0.76 moles of polycaprolactone, that is 760 g of polycaprolactone and 20 g of multiblock emulsifying agent are reacted with 3 moles (375 g) of diphenylmethane diisocyanate at 80° C. for 4 hours. The mixture thus obtained is mixed in a low-pressure casting machine with a second mixture consisting of 240 g of polycaprolactone and 90 g of 1,4-butanediol.

The urethane polymer composition obtained is then cast in a mold, where it undergoes a cure of 6 hours at 110° C.

The static mechanical properties of this material were tested. The results appear in Table I.

TABLE I

Static mechanical properties of PU containing PCL flexible sequence. Influence of the multiblock emulsifying agent.

| TEST | BREAKING STRESS $\tau b$ (MPa) | ELONGATION AT BREAK $\epsilon b$ (%) |
| --- | --- | --- |
| without emulsifying agent | 38.2 | 410 ± 10 |
| 2% emulsifying agent | 43.4 | 430 ± 10 |

The uniaxial tensile tests were carried out at 5 mm min$^{-1}$ on test specimens of H3 type.

We claim:

1. A urethane polymer composition which contains:
   an $\alpha,\omega$-diol oligomer
   an isocyanate,
   a chain extender diol, and
   an emulsifying agent which is the product of reaction between:
   (a) an $\alpha,\omega$-diol oligomer whose chain structure is identical or close in polarity to that of the above $\alpha,\omega$-diol oligomer,
   (b) a diisocyanate, and optionally
   (c) a chain extender of the diol or monoalcohol type, such as a monofunctional polyethylene oxide.

2. The urethane polymer composition as claimed in claim 1, wherein the $\alpha,\omega$-diol oligomer is based on polyolefin of synthetic origin, such as polybutadiene, hydrogenated polybutadiene, on polyolefin of natural origin such as castor oil, on polysiloxane, polyether or on polyester.

3. The urethane polymer composition as claimed in claim 1 wherein the $\alpha,\omega$-diol oligomer is of nonpolar type such as the polyolefins of synthetic origin, in particular polybutadiene, polyisoprene, hydrogenated polybutadiene, or polyolefins of natural origin, in particular castor oil or polysiloxanes.

4. The urethane polymer composition as claimed in claim 1 wherein the $\alpha,\omega$-diol oligomer has a number-average molecular mass of between 600 and 10,000 and preferably between 2,000 and 4,000 and a number-average functionality Fn (OH) of between 1.6 and 4 and preferably close to 2.

5. The urethane polymer composition as claimed in claim 1 wherein the isocyanate is chosen from the usual diisocyanates and preferably 2,4- or 2,6-toluene diisocyanate, diphenylmethane diisocyanate and derivatives of these products with a functionality higher than 2.

6. The urethane polymer composition as claimed in claim 1 wherein the said chain extender diol is chosen from the usual diols with a molecular mass lower than 500 and preferably hydroquinone di-$\beta$-hydroxyethyl ether and butanediol.

7. The urethane polymer composition as claimed in claim 1 wherein the said $\alpha,\omega$-diol oligomer, the said isocyanate and the said chain extender diol react, in the presence of the emulsifying agent, with a respective stoichiometry included between the 1/2/1 and 1/7/6 formulations and preferably with a stoichiometry close to 1/3/2.

8. The urethane polymer composition as claimed in claim 1 wherein the monofunctional polyethylene oxide has a molecular mass of between 46 and 5,000 and preferably between 250 and 500.

9. The urethane polymer composition as claimed in claim 1 wherein the said emulsifying agent is present in a concentration of 1 to 10% by weight and preferably of 2 to 5% by weight.

10. The urethane polymer composition as claimed in claim 1 wherein the said $\alpha,\omega$-diol oligomer, the said diisocyanate and optionally the said chain extender diol react with a respective stoichiometry included between the limiting formulations 1/1/0 and 1/3/2 and preferably with formulations close to 1/1/0 or 1/2/1.

11. The urethane polymer composition as claimed in claim 1 wherein the said $\alpha,\omega$-diol oligomer, the said diisocyanate and the monofunctional polyethylene oxide react with a stoichiometry included between 1/2/2 and 1/4/6 and preferably close to 1/2/2.

12. A process for the preparation of articles made of urethane polymer as claimed in claim 1 wherein:
   the emulsifying agent is mixed with the said $\alpha,\omega$-diol oligomer so as to obtain a dispersion of the emulsifying agent in the $\alpha,\omega$-diol oligomer,
   the said dispersion is heated with the said isocyanate and then, optionally,
   the said chain extender diol is added to the mixture thus obtained so as to obtain a composition, and
   the shaping of the article is produced by hot molding of this composition.

13. The process as claimed in claim 12, wherein the emulsifying agent is initially dispersed only in a part of the $\alpha,\omega$-diol oligomer, the remaining part of the latter being introduced in the course of the subsequent stage of heating with the said isocyanate.

14. The process for the preparation of articles made of urethane polymer, as claimed in claim 12 wherein the emulsifier is prepared in solution:
   by heating the said $\alpha,\omega$-diol oligomer mixed with the said diisocyanate, by dissolving the mixture thus obtained in a polar solvent at 25° C., by adding the chain extender diol to this solution, and by heating the solution thus obtained.

15. The process for the preparation of articles made of urethane polymer as claimed in claim 12 wherein the emulsifier is prepared in bulk:

by heating the said isocyanate and the $\alpha,\omega$-diol oligomer, by adding the said monofunctional polyethylene oxide to the mixture thus obtained, and by heating this last mixture.

16. The process for the preparation of articles made of urethane polymer as claimed in claim 14, wherein the emulsifying agent is mixed with the said $\alpha,\omega$-diol oligomer so as to obtain a dispersion of the emulsifying agent at a concentration of 5% by weight in the $\alpha,\omega$-diol oligomer.

17. The process for the preparation of articles made of urethane polymer as claimed in claim 14, wherein the polar solvent is chosen from dioxane, DMF, THF and their mixtures.

18. The process for the preparation of articles made of urethane polymer as claimed in claim 14, wherein an organometallic catalyst may be introduced into the preparation of the said emulsifying agent.

19. A process for the preparation of articles made of urethane polymer as claimed in claim 18, wherein the quantity of the said catalyst which is employed for preparing the emulsifying agent corresponds to 0.01% by mass of the total mass of the reactants of the emulsifying agent.

20. A molded article which is obtained from a urethane polymer composition as claimed in claim 1.

21. A molded article as claimed in claim 19, which is employed as dielectric component.

* * * * *